United States Patent [19]
Loeffler et al.

[11] Patent Number: 5,251,727
[45] Date of Patent: Oct. 12, 1993

[54] WEAR COMPENSATING RETURN SPRING FOR FLOATING CALIPER DISC BRAKE SHOES

[75] Inventors: Josef Loeffler; Hilmar Teitge, both of Frankfurt am Main, Fed. Rep. of Germany

[73] Assignee: Alfred Teves GmbH, Frankfurt am Main, Fed. Rep. of Germany

[21] Appl. No.: 882,990

[22] Filed: May 14, 1992

[30] Foreign Application Priority Data

May 14, 1991 [DE] Fed. Rep. of Germany ....... 4115635

[51] Int. Cl.⁵ .............................................. F16D 65/02
[52] U.S. Cl. ............................ 188/73.38; 188/205 A
[58] Field of Search ................ 188/71.8, 73.38, 72.3, 188/205 A

[56] References Cited

U.S. PATENT DOCUMENTS

| 4,658,938 | 4/1987 | Thiel et al. ................ 188/73.38 |
| 4,809,825 | 3/1989 | Oltmanns, Jr. et al. ......... 188/73.38 |

FOREIGN PATENT DOCUMENTS

| 1199552 | 1/1963 | Fed. Rep. of Germany . |
| 2212464 | 3/1972 | Fed. Rep. of Germany . |
| 3130185 | 7/1981 | Fed. Rep. of Germany . |
| 3244790 | 12/1982 | Fed. Rep. of Germany . |
| 137434 | 6/1987 | Japan . |
| 1037238 | 7/1966 | United Kingdom ............. 188/73.38 |
| 1425269 | 2/1976 | United Kingdom ............. 188/73.38 |

Primary Examiner—Matthew C. Graham
Attorney, Agent, or Firm—Robert P. Seitter; J. Gordon Lewis

[57] ABSTRACT

A floating-caliper disc brake is described of a type having brake shoes (3, 4) which are positioned on either side of a brake disc (2) and with a brake caliper (1) which straddles the brake shoes (3, 4) and the edge of said brake disc (2), which brake caliper is axially slidingly supported on a brake carrier (5). A brake piston is mounted in the brake caliper (10) adjacent one brake shoe (4). A spring element (12) is disposed extending between the brake piston and a facing surface of the brake caliper adjacent the other brake shoe and acts to retract each brake shoe to create a clearance with the brake disc. The spring element is elastically and plastically deformable by an actuating stroke of the brake piston (10), the elastic deformability being limited to an actuating stroke which corresponds to the brake clearance of both brake shoes (3, 4), the plastic deformation compensating brake lining wear.

10 Claims, 3 Drawing Sheets

WEAR COMPENSATING RETURN SPRING FOR FLOATING CALIPER DISC BRAKE SHOES

BACKGROUND OF THE INVENTION

The invention is related to a floating-caliper disc brake, in particular for automotive vehicles, with brake shoes which are positioned on either side of a brake disc and with a brake caliper which straddles the brake shoes and the edge of said brake disc. The brake caliper is axially slidingly supported on a brake carrier and has a portion on one side of the brake disc mounting a brake piston adjacent one of the brake shoes.

A floating-caliper disc brake of the kind indicated floating-caliper disc brakes of this kind, the brake shoe adjacent the brake piston is axially slid by the latter and urged against the brake disc upon actuation of the brake. The brake shoe positioned on the other side of the brake disc is moved toward the brake disc and urged against the latter by the opposite movement of the brake caliper in reaction to the movement of the brake piston, a portion of the brake caliper extending behind the other brake shoe to engage the same. At the end of the braking operation, the brake piston is retracted into the cylinder bore in the brake caliper due to the restoring effect of a piston sealing ring.

The brake shoe adjacent the brake piston is fixed to the brake piston by a claw-type spring engaging the bore of the brake piston, so that a brake clearance is established at this brake shoe. The clearance of brake shoe actuated by the brake caliper is generated by thrusts exerted by the brake disc by which the brake shoe together with the brake caliper is brought back into the brake release position countering the resistance to movement of its bearing.

A connection of the brake piston with the adjacent brake shoe requires, however, a particular configuration of the support of the brake shoe which is not always expedient. In order to render possible the clearance of the brake shoes of the disc brake without any connection between the brake piston and the brake shoe, it is, furthermore, prior art to position a holding-down spring at the brake caliper which acts upon the radially external edges of the carrier plates of the brake shoes by means of spring arms being inclined radially inwardly and in the direction of the center of the brake disc. As a result, a force component becomes effective at the brake shoes in the direction of brake release which restores the brake shoes after retraction of the brake piston.

The state-of-the-art spring arrangement has, however, the disadvantage that the restoring effect depends on the differing frictional conditions at the point of contact between spring arm and carrier plate and that the spring force and, thus, the restoring force increases as the wear of the brake linings proceeds.

It is the object of the invention to improve such a floating-caliper disc brake in such a manner that upon the release of the brake, the return of the brake shoes takes place independently of frictional forces and of the condition of wear.

SUMMARY OF THE INVENTION

According to the invention, this object is attained in that between the brake piston and a supporting surface of the brake caliper facing the actuating surface of the brake piston, an elongated spring element is disposed, having angled portions each engaging one of the brake shoes. The spring element has a middle portion which is elastically and plastically deformable by an actuating stroke of the brake piston. The elastic deformability is limited to a distance which corresponds to the brake clearance of both brake shoes so that upon relaxing of the spring, the angled portions spread the brake shoes away from the brake disc to establish a predetermined clearance.

By this configuration an active return of the brake shoes is achieved by relaxing of the elastic deformation of a spring element after the brake piston actuating force ceases.

The restoring force can be considerably higher than the restoring force of the prior art piston sealing ring or of the prior-art spring arrangements. The restoring force is exerted directly on the brake shoes so that the latter move clear of the brake disc without any additional assistance by the brake disc. Due to the plastic deformability, of the spring element the wear of the brake shoes is compensated, and as a result the restoring movement remains constant over the entire range of wear of the brake shoes.

In addition, the plastic deformability of the spring element affords a compensation of manufacturing inaccuracies in a new brake caliper. The supporting surface at the brake caliper may, therefore, be cast and does not require any additional machining.

The inventive spring element also acts to eliminate rattling noise, since even when the brake is in the released condition, the brake shoes are retained in their guides without play by the angled tips of the spring element.

In a particularly advantageous embodiment of the invention, it is envisaged that the spring element is positioned radially outside the brake shoes and at each brake shoe has a spring arm in abutment against the external edge of the carrier plate of the associated brake shoe. According to the invention, the spring arms comprise angled portions inclined radially and axially, and as a result, a force component acts on the brake shoes in the direction of release of the brake. The force component of the spring element which is caused by elastic deformation also eliminate rattling noise.

According to another feature of the invention, the spring element is coupled to a supporting disc which is arranged between the front surface of the brake piston and the brake shoe adjacent the brake piston. The supporting disc serves, on one hand, to fix the spring element within the brake caliper and, on the other hand, it acts as a heat insulation between the brake piston and the brake shoe. Furthermore, the supporting disc diminishes squealing noise in the event of actuation of the disc brake. In order to couple the supporting disc to the brake piston and in order to align it in its position with respect to the brake piston, it may, moreover be envisaged that the supporting disc is formed with fingers which are bent out of its plane and which engage the bore of the brake piston.

In one preferred embodiment of the invention, the spring element is configured as a formed elongated element of sheet or plate metal. In this case, the elastically and plastically deformable range of the spring element may be constituted by bends or offsets which are positioned in the middle between the supporting surfaces at the brake piston and at the brake caliper. For ease of manufacture the shaped element of sheet or plate metal may be shaped from a plane sheet or plate metal strip by multiple bending.

DESCRIPTION OF THE DRAWINGS

The invention will be described in more detail making reference to embodiments which are illustrated in the accompanying drawing. In the drawing.

DETAILED DESCRIPTION

Figure 1:
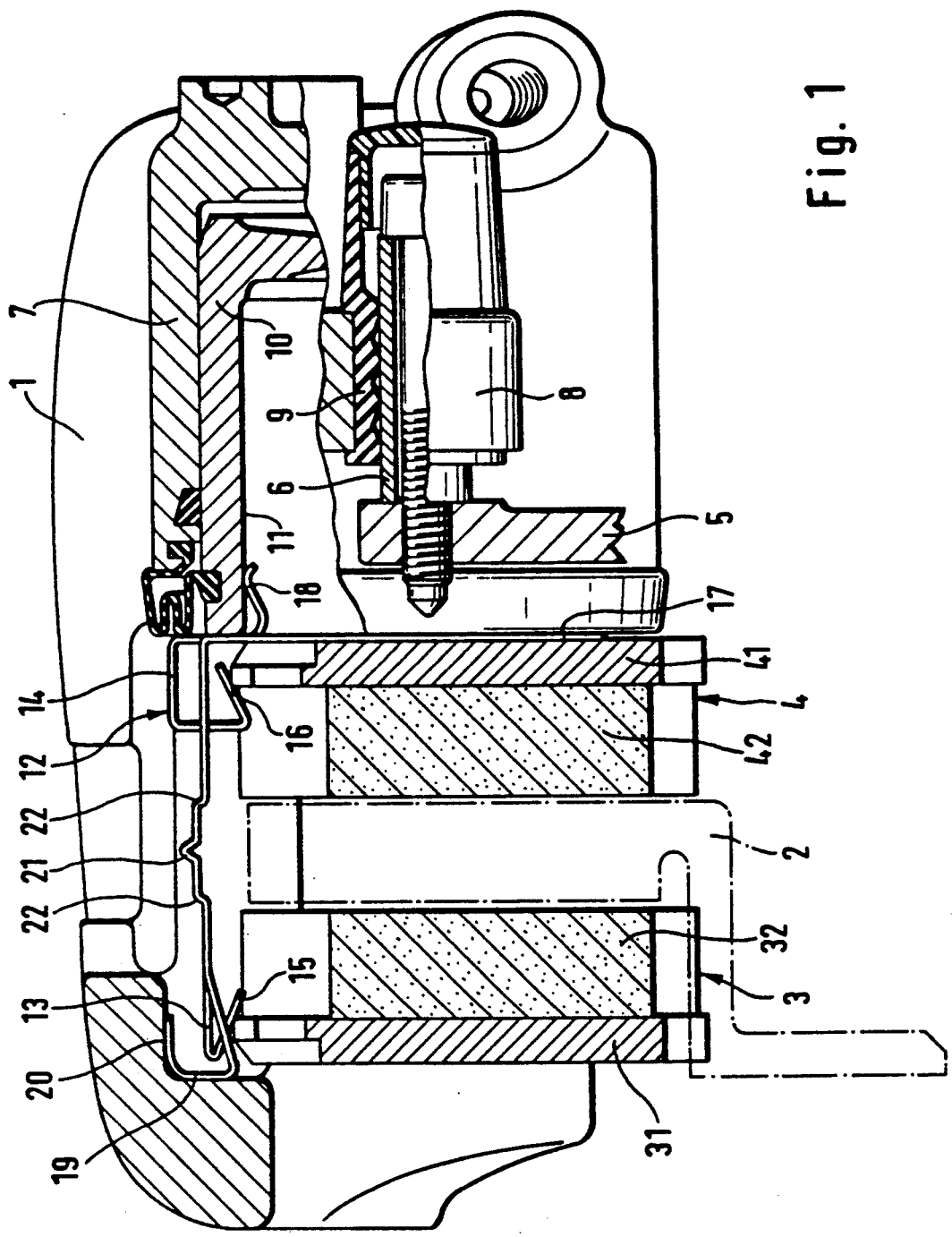
FIG. 1 is a cross sectional view of a floating caliper disc brake with an elastically and plastically deformable spring element according to the present invention.
Figure 2:
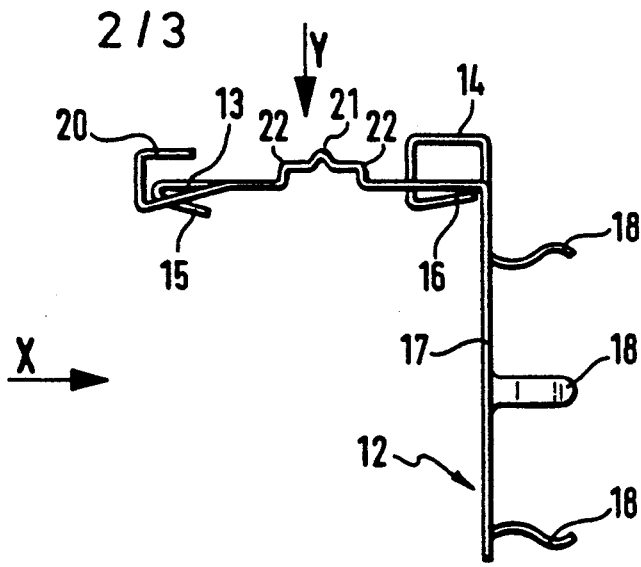
FIG. 2 is a side view of the spring element incorporated in the disc brake according to FIG. 1.
Figure 3:
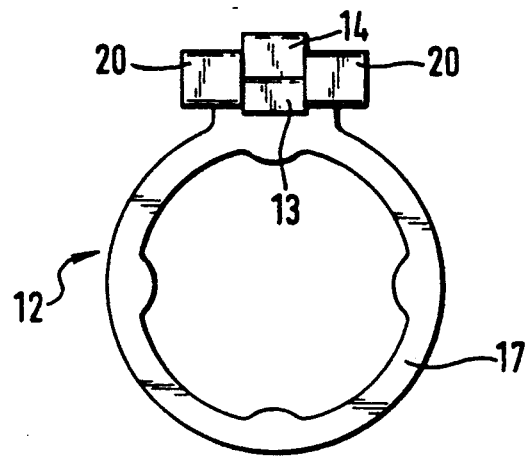
FIG. 3 is a view from the direction X of the spring element according to FIG. 2.
Figure 4:
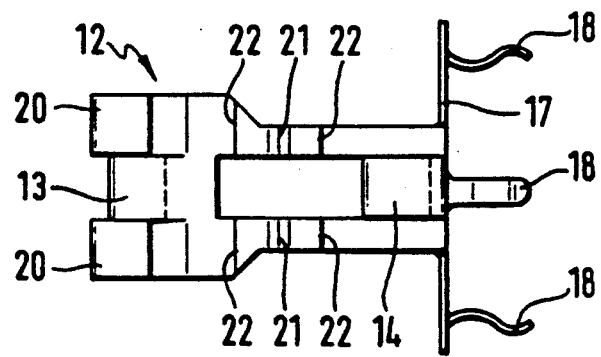
FIG. 4 is a view from the direction Y of the spring element according to FIG. 2.

The floating-caliper disc brake illustrated in FIG. 1 is furnished with a brake caliper 1 which straddles the outside edge of a brake disc 2 and brake shoes 3, 4 positioned on either side of the brake disc 2. The brake caliper 1 is axially slidingly guided on two cylindrical guide sleeves 6 rigidly screwed to a brake carrier 5. The guide sleeves 6 are positioned on either side of a brake cylinder 7 which is mounted by the brake caliper 1 and extend parallel to the cylinder axis. On the outside of the brake cylinder 7 two bearing eyes 8 are disposed with bearing bushings 9 of an elastomeric material which embrace the bearing sleeves 6.

A hydraulically actuatable brake piston 10 is provided in the brake cylinder 7. The brake piston 10 is cup-shaped and has an open bore 11 faceing the brake shoe 4.

The brake shoes 3, 4 are each comprised of a carrier plate 31, 41 and of a friction lining 32, 42 carried by a respective carrier plate 31, 41 At their opposite ends in a tangential direction relative to the brake disc 2, the carrier plates 31, 41 are retained at supporting surfaces of the brake caliper or of the brake carrier in a well known manner, and are slidable in the direction of the axis of rotation of the brake disc 2.

The carrier plates 31, 41 are urged against the supporting surfaces in a radial direction by a spring element 12. The spring element 12 is positioned between the bridge section of the brake caliper 1 and the edge of the brake disc 2 and is furnished with spring arms 13, 14. Angled end sections 15, 16 are inclined radially and axially and are engaged on the radially external edges of the brake shoe carrier plates 31, 41 so as to push the associated brake shoe 3, 4 away from the brake disc 2.

Due to the inclination of the end sections 15, 16, the spring arms 13, 14 generate both an inwardly directed force component which urges the carrier plates 31, 41 against their guide surfaces and thereby retains them free of rattling noise, and a force component being directed axially away from the brake disc by which the carrier plates 31, 41 are respectively urged against the brake caliper 1 and the brake piston 10, in the releasing direction of the brake.

At one end, the spring element 12 is provided with a blunt portion comprised of a circular ring-shaped disc 17 which is aligned at right angle to the longitudinal axis of the spring element 12 and which is positioned between the front surface of the brake piston 10 and the carrier plate 41 of the brake shoe 4. From the internal edge of the disc 17, fingers 18 are formed over which engage the bore 11 of the brake piston and align the disc 17 with respect to the brake piston 10. With the aid of the disc 17, the spring element 12 is firmly connected to the brake piston 10 during a brake actuating operation, so that the forces required for its plastic and elastic deformation can be transmitted from the brake piston 10 to the spring element 12.

The blunt end 19 of the spring element 12 which is positioned opposite the disc 17 is abutted in axial and in radial direction against a supporting surface 20 on the side of the brake caliper 1 opposite piston 10. As a result of this, the forces counteracting the force component of the spring arm 13 and counteracting the force of deformation caused by the brake piston 10 will be absorbed by the brake caliper 1. When the brake is in the released position, the radial counteracting force resulting from the force component of the spring arm 14 will be transmitted to the brake piston 10 by the fingers 18.

Approximately in its center, the spring element 12 is formed with a radially outwardly projecting bend 21 and on either side of the bend 21 is formed with an offset 22. Each of the bending edges of the bend 21 and of the offsets 22 extends at a right angle to the longitudinal axis of the spring element 12. By the bend 21 and offsets 22, an elastically and plastically deformable range is created whose elastic deformability corresponds to the required brake clearance between the brake disc 2 and the two brake shoes 3, 4.

This results, thus, in the following mode of operation:

Upon actuation of the brake piston 10, first of all the brake shoes 3, 4 with their friction linings 32, 42 will be brought in abutment against the brake disc 2 after having overcome the existing brake clearance. Simultaneously, the spring element 12 will be compressed in longitudinal direction, whereby it will become elastically deformed in the range of the bend 21 and of the offsets 22. When the brake is released again without any wear having come about at the friction linings 32, 42, then the brake piston 10 will return into its initial position, whereby the spring element 12 will relax and through the engagement of the spring arms 13, 14, will move the brake shoes 3, 4 back into their position of rest, restoring the brake clearance between the friction linings 32, 42 and the brake disc 2.

If and when wear occurs at the brake linings 32, 42, in the course of a braking operation the brake piston 10 will move nearer to the supporting surface 20. As a result, the spring element 12 will be deformed to a greater extent. In this case, the limit of elasticity will be exceeded during the deformation of the sections of the spring element 12, so that a permanent plastic deformation will take place. In the event of the subsequent spring element 12 will be smaller than the distance of deformation upon the actuation of the brake by the extent of this permanent plastic deformation. The brake shoes 3, 4 will thus again be moved back the distance of the brake clearance which is determined by the distance of elastic deformation of the spring element 12 and the wear of the brake linings 32, 42 which has taken place will be compensated.

Figure 5:
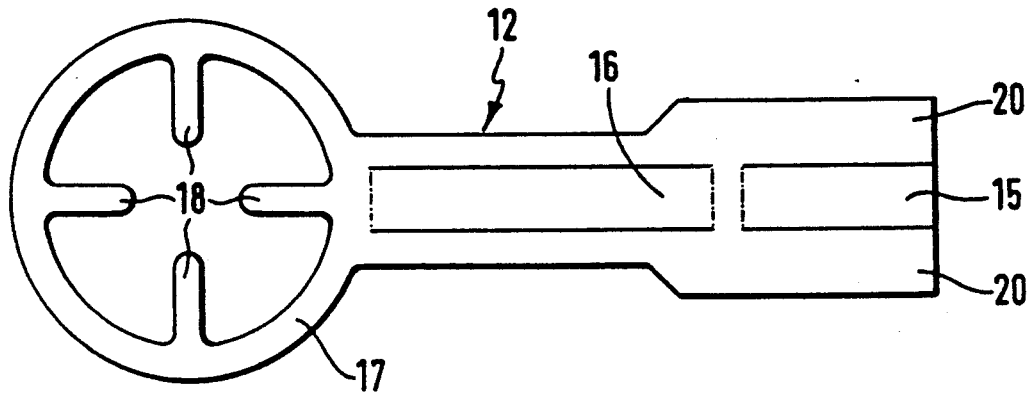
FIG. 5 shows a developed projection of the spring element according to FIG. 2.

The detailed embodiment of the spring element 12 is illustrated in FIGS. 2 to 5. In the plane developed projection which is shown in FIG. 5 the spring element 12 may be stamped out in one cut by a cutting tool and be brought into its definite shape by bending and offsetting it several times over.

Figure 6:
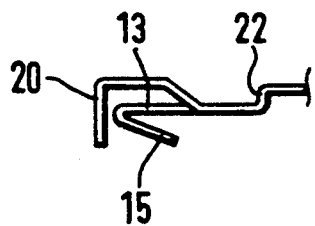
FIG. 6 is a fragmentary side view of a portion of the spring element according to a variation of the invention.
Figure 7:
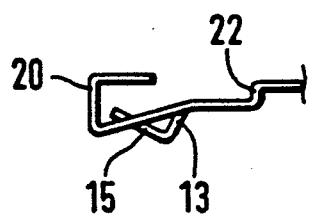
FIG. 7 is a fragmentary side view of a second variant of a portion of the spring element according to the invention.

In FIGS. 6 and 7 potential variations of the configuration of the blunt end 19 of the spring element 12 are illustrated.

According to FIG. 6, the blunt end 19 which is subdivided into two sections by the spring arm 13 is bent into the opposite direction with respect to the embodiment according to FIGS. 1 to 5. In the variant as per FIG. 7 the end section 15 of the spring arm 13 is not bent back completely but bent off instead at approximately right angle in the opposite direction, the spring arm 13 having thereby being distinctly reduced in length. As a result of this, a greater rigidity results in the spring characteristic of the end section 15.

We claim:

1. A floating-caliper disc brake, in particular for automotive vehicles, including a rotary brake disc, a fixed brake carrier adjacent said brake disc brake shoes, each brake shoe comprising a backing plate and a friction lining fixed thereto, said brake shoes positioned respectively on either side of said brake disc, and mounted to be axially movable towards and away from said brake disc, a brake caliper which straddles said brake shoes and an outer edge of said brake disc and which is axially slidingly supported on said brake carrier, an actuatable brake piston mounted in said brake caliper adjacent and facing one side of said of said brake shoes, said brake caliper including a supporting surface on the other side of said other brake shoe, an elongated spring element extending across both of said brake shoes and compressed lengthwise between said brake piston and said brake caliper supporting surface, said spring element including a pair of arm portions, each arm portion located at a respective end of said spring element, each arm portion engaging a carrier plate of a respective one of said brake shoes and exerting a retracting force thereon upon releasing actuation of said brake piston, said spring element elastically deformed by an actuating stroke of said brake piston, said elastic deformation limited to that occuring by a predetermined actuating stroke, which actuating stroke corresponds to a combined normal clearance of both said brake shoes with said brake disc, said spring element including a section plastically deformed if said elastic actuating stroke exceeds said predetermined actuating stroke producing an elastic deformation of said spring element.

2. A floating-caliper disc brake as claimed in claim 1, wherein said spring element is positioned radially outside said brake shoes, and wherein each spring arm portion is in abutment against an external edge of a respective backing plate of an associated brake shoe.

3. A floating-caliper disc brake as claimed in claim 2, wherein each of said spring arm portions comprise angled tips inclined radially and axially in a direction tending to move said respective brake shoe away from said brake disc.

4. A floating-caliper disc brake as claimed in claim 1, wherein said spring element is coupled to a supporting disc which is interposed between an adjacent surface of said brake piston and said brake shoe adjacent said brake piston.

5. A floating-caliper disc brake as claimed in claim 4, wherein said brake piston is formed with an open bore defining a brake piston side wall, said open bore facing said adjacent brake shoe, and wherein said supporting disc is formed with fingers which are bent normally and which engage said side wall defined by said bore of said brake piston.

6. A floating-caliper disc brake as claimed in claim 1, wherein said spring element is comprised of a shaped element of sheet metal.

7. A floating-caliper disc brake as claimed in claim 1, wherein said spring element comprises an elongated flat metal strip and includes an elastically and plastically deformable section formed by bends which are located in an intermediate portion between said supporting surface and said brake piston.

8. A floating-caliper disc brake as claimed in claim 8, wherein said spring arm portions comprise angled portions extending both radially and axially at either end of said flat metal strip, each angled portion engaging a brake shoe backing plate so as to exert a force spreading said brake shoes away from said brake disc.

9. A floating-caliper disc brake as claimed in claim 9, wherein said spring element is formed with blunt portions at each end which positively engage said brake piston and said supporting surface of said brake caliper respectively, said blunt portions each straddling a respective angled portion.

10. A floating-caliper disc brake as claimed in claim 9, wherein said blunt portion engaging said brake piston comprises a disc bent at right angles to said intermediate portion, said disc overlying said brake piston.

* * * * *